(12) United States Patent
Vesdapunt et al.

(10) Patent No.: US 11,036,975 B2
(45) Date of Patent: Jun. 15, 2021

(54) HUMAN POSE ESTIMATION

(71) Applicant: Microsoft Technology Licensing, LLC, Redmond, WA (US)

(72) Inventors: Noranart Vesdapunt, Bellevue, WA (US); Baoyuan Wang, Sammamish, WA (US); Ying Jin, Redmond, WA (US); Pierrick Arsenault, Montréal (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 67 days.

(21) Appl. No.: 16/220,797

(22) Filed: Dec. 14, 2018

(65) Prior Publication Data

US 2020/0193152 A1 Jun. 18, 2020

(51) Int. Cl.
| | |
|---|---|
| *G06K 9/00* | (2006.01) |
| *G06T 7/73* | (2017.01) |
| *G06F 3/01* | (2006.01) |
| *G06N 3/08* | (2006.01) |
| *G06K 9/62* | (2006.01) |
| *G06T 1/20* | (2006.01) |

(52) U.S. Cl.
CPC ......... *G06K 9/00369* (2013.01); *G06F 3/017* (2013.01); *G06K 9/00335* (2013.01); *G06N 3/08* (2013.01); *G06T 7/75* (2017.01); *G06K 9/00624* (2013.01); *G06K 9/627* (2013.01); *G06K 9/6217* (2013.01); *G06T 1/20* (2013.01); *G06T 2207/30196* (2013.01)

(58) Field of Classification Search
CPC ... G06F 40/295; G06F 3/017; G06K 2209/01; G06K 9/00469; G06K 9/2081; G06K 9/3258; G06K 9/6269; G06K 9/00369; G06K 9/00624; G06K 9/6217; G06K 9/627; G06K 9/20; G06N 5/046; G06N 3/08; G06T 7/75; G06T 2207/30196
See application file for complete search history.

(56) References Cited

U.S. PATENT DOCUMENTS

| | | | |
|---|---|---|---|
| 7,848,548 B1 * | 12/2010 | Moon | G06K 9/68 382/118 |
| 9,881,234 B2 * | 1/2018 | Huang | G06K 9/6232 |
| 2015/0309579 A1 | 10/2015 | Wang et al. | |

(Continued)

OTHER PUBLICATIONS

Brazil, et al., "Illuminating Pedestrians via Simultaneous Detection & Segmentation", In Proceedings of International Conference on Computer Vision, Oct. 1, 2017, pp. 4950-4959.

(Continued)

*Primary Examiner* — Ian L Lemieux
(74) *Attorney, Agent, or Firm* — Rainier Patents, P.S.

(57) ABSTRACT

Described herein is a human pose prediction system and method. An image comprising at least a portion of a human body is received. A trained neural network is used to predict one or more human features (e.g., joints/aspects of a human body) within the received image, and, to predict one or more human poses in accordance with the predicted one or more human features. The trained neural network can be an end-to-end trained, single stage deep neural network. An action is performed based on the predicted one or more human poses. For example, the human pose(s) can be displayed as an overlay with received image.

20 Claims, 10 Drawing Sheets

(56) References Cited

U.S. PATENT DOCUMENTS

| | | | |
|---|---|---|---|
| 2017/0168586 A1* | 6/2017 | Sinha | G06N 20/00 |
| 2017/0316578 A1* | 11/2017 | Fua | G06T 7/246 |
| 2018/0137644 A1* | 5/2018 | Rad | G06K 9/00208 |
| 2018/0285634 A1* | 10/2018 | Varadarajan | G06T 7/73 |
| 2019/0026538 A1* | 1/2019 | Wang | G06K 9/4642 |
| 2019/0026548 A1* | 1/2019 | Varadarajan | G06K 9/00369 |
| 2019/0171871 A1* | 6/2019 | Zhang | G06K 9/00369 |
| 2019/0172223 A1* | 6/2019 | Vajda | G06K 9/4633 |
| 2019/0172224 A1* | 6/2019 | Vajda | G06T 7/77 |
| 2019/0259136 A1* | 8/2019 | Shpalensky | G06T 5/50 |
| 2019/0294881 A1* | 9/2019 | Polak | G06K 9/4628 |
| 2019/0347826 A1* | 11/2019 | Zhang | G06N 3/08 |
| 2019/0371080 A1* | 12/2019 | Sminchisescu | G06T 19/00 |
| 2019/0379819 A1* | 12/2019 | Shimada | H04N 5/23229 |

OTHER PUBLICATIONS

Cao, et al., "Realtime Multiperson 2d Pose Estimation Using Part Affinity Fields", In Proceedings of IEEE Conference on Computer Vision and Pattern Recognition, Jul. 21, 2017, pp. 7291-7299.

Chen, et al., "Cascaded Pyramid Network for Multi-Person Pose Estimation", In Proceedings of IEEE Conference on Computer Vision and Pattern Recognition, Jun. 18, 2018, pp. 7103-7112.

Du, et al., "Fused Deep Neural Networks for Efficient Pedestrian Detection", Retrieved from: https://arxiv.org/pdf/1805.08688.pdf, May 2, 2018, pp. 1-11.

Huang, et al., "A Coarse-Fine Network for Keypoint Localization", In Proceedings of IEEE International Conference on Computer Vision, Oct. 22, 2017, pp. 3028-3037.

Insafutdinov, et al., "Deepercut: A Deeper, Stronger, and Faster Multiperson Pose Estimation Model", In Proceedings of European Conference on Computer Vision, Oct. 8, 2016, pp. 1-22.

Lin, et al., "Microsoft COCO: Common Objects in Context", In European Conference on Computer Vision, Sep. 6, 2014, pp. 740-755.

Liu, et al., "SSD: Single Shot Multibox Detector", In Proceedings of European Conference on Computer Vision, Oct. 8, 2016, pp. 21-37.

Newell, et al., "Associative Embedding: End-to-End Learning for Joint Detection and Grouping", Retrieved from: https://arxiv.org/pdf/1611.05424v1.pdf, Nov. 16, 2016, pp. 1-10.

Papandreou, et al., "Towards Accurate Multi-Person Pose Estimation in the Wild", In Proceedings of IEEE Conference on Computer Vision and Pattern Recognition, vol. 3, Issue 4, Jan. 6, 2017, pp. 4903-4911.

Redmon, et al., "You only look once: Unified real-time object detection", In Proceedings of the IEEE Conference on Computer Vision and Pattern Recognition, Jun. 27, 2016, pp. 779-788.

Song, et al., "Small-scale Pedestrian Detection Based on Somatic Topology Localization and Temporal Feature Aggregation", Retrieved from: https://arxiv.org/pdf/1807.01438.pdf, Jul. 4, 2018, pp. 1-16.

Wang, et al., "PCN: Part and Context information for Pedestrian Detection with CNNs", Retrieved From: https://arxiv.org/pdf/1804.04483.pdf, Apr. 12, 2018, pp. 1-13.

Zhang, et al. "Fast Human Pose Estimation", Retrieved from: https://arxiv.org/pdf/1811.05419.pdf, Nov. 13, 2018, 10 pages.

Zhu, et al., "Towards Accurate Multiperson Pose Estimation in the Wild", In Proceedings of Conference on Computer Vision and Pattern Recognition, vol. 3, Issue 4, Jan. 6, 2017, pp. 4903-4911.

U.S. Appl. No. 16/023,432, filed Jun. 29, 2018, 31 pages.

Xiao, et al, "Simple Baselines for Human Pose Estimation and Tracking", Retrieved from: https://arxiv.org/abs/1804.06208, Aug. 21, 2018, 16 pages.

"International Search Report and Written Opinion Issued in PCT Application No. PCT/US19/064806", dated Mar. 5, 2020, 11 Pages.

Nie, et al., "Hierarchical Contextual Refinement Networks for Human Pose Estimation", In Proceedings of IEEE Transactions on Image Processing, vol. 28 , Issue 2, Feb. 2019, pp. 924-936.

Rogez, et al., "LCR-Net++: Multi-Person 2D and 3D Pose Detection in Natural Images", In Proceedings of IEEE Transactions on Pattern Analysis and Machine Intelligence, Oct. 13, 2018, 15 Pages.

\* cited by examiner

HUMAN POSE ESTIMATION

BACKGROUND

Human pose estimation is one of the foundations of human understanding which yields many applications in the world of computer vision. Although the problem has been widely studied, running a human pose estimation algorithm in real-time on device(s) with limited processing capability (e.g., mobile phone(s), HoloLens®, sensor(s), etc.) can be challenging.

SUMMARY

Described herein is a human pose prediction system, comprising: a computer comprising a processor and a memory having computer-executable instructions stored thereupon which, when executed by the processor, cause the computer to: receive an image comprising at least a portion of a human body; use a trained neural network to predict one or more human features within the received image, wherein the trained neural network comprises an end-to-end trained, single stage deep neural network, and, to predict one or more human poses in accordance with the predicted one or more human features; and perform an action based on the predicted one or more human poses.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
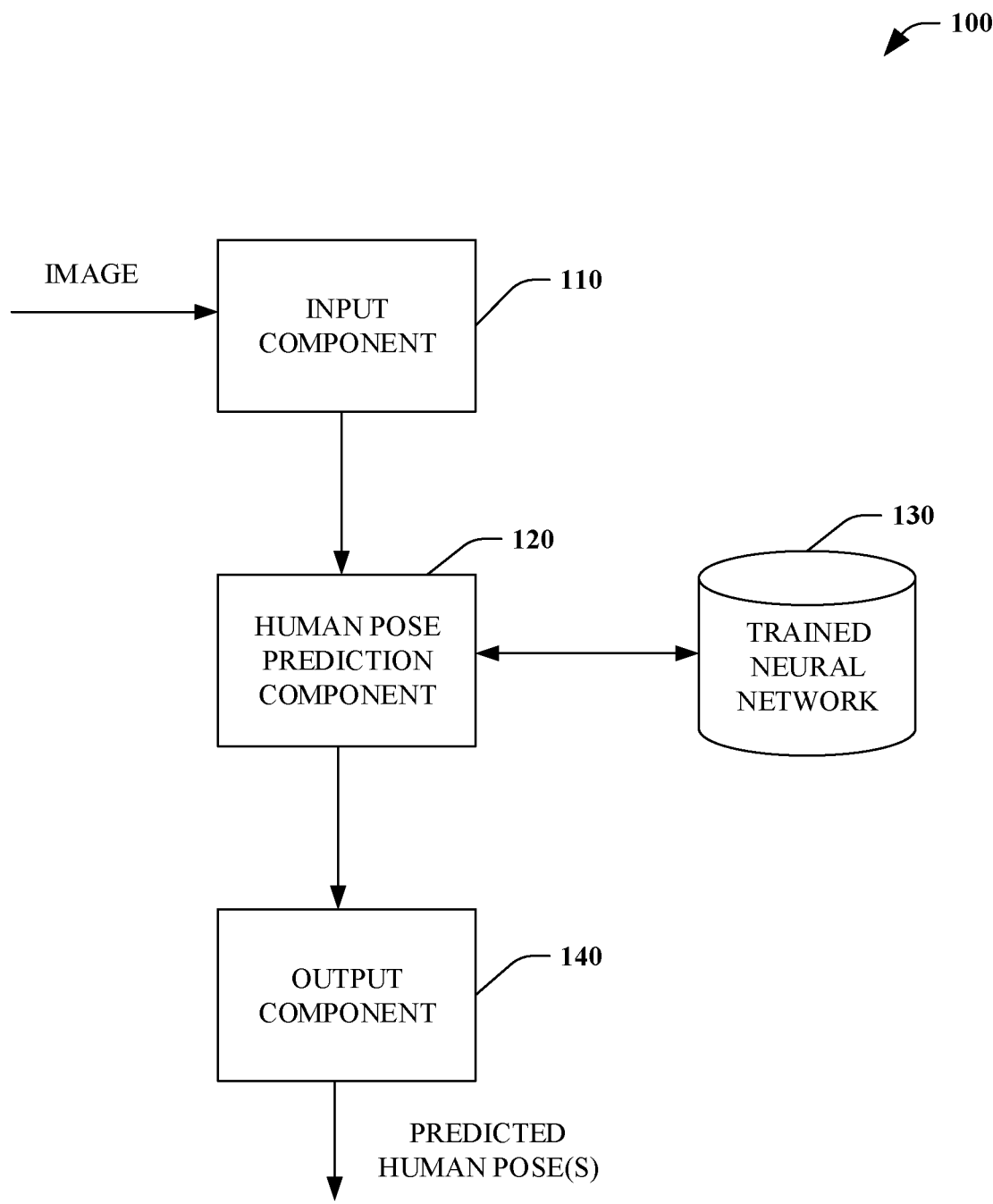
FIG. 1 is a functional block diagram that illustrates a human pose prediction system.

Various technologies pertaining to real-time human pose prediction are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding real-time human pose prediction. What follows are one or more exemplary systems and methods.

Aspects of the subject disclosure pertain to the technical problem of real-time human pose prediction. The technical features associated with addressing this problem involve receiving an image comprising at least a portion of a human body; using a trained neural network to predict one or more human features within the received image, and, to predict one or more human poses in accordance with the predicted one or more human features; and, performing an action based on the predicted one or more human poses. Accordingly, aspects of these technical features exhibit technical effects of more efficiently and effectively predicting human poses, for example, reducing consumption of computer resources (e.g., processing and/or memory).

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

Human pose estimation is one of the foundations of human understanding which yields many applications in the world of computer vision. Although the problem has been widely studied, running a human pose estimation algorithm in real-time on device(s) with limited processing capability (e.g., mobile phone(s), HoloLens®, sensor(s), etc.) is challenging.

Conventionally, pose estimation techniques can be categorized into two groups: (1) top-down; and (2) bottom-up. Top-down is a generally precise technique but computationally expensive method because it utilizes a person detector prior to running another pose estimator on every single person detected. Accurate person detectors can be in the form of large and slow deep neural network (DNNs). The output of a person detector comprises a bounding box for each detected person. If the scene contains multiple people, a pose can be extracted for each detected person using another DNN. This can result in a linear slow down with respect to the number of people in addition to the constant time from the person detector.

The bottom-up technique directly predicts human parts, and therefore, does not require person detector. However, an image comprising multiple parts from multiple people can be ambiguous because they can occlude or contact each other. These methods require extra output (e.g., such as affinity field, pixel-wise embedding, image-conditioned pairwise terms, etc.) to combine human parts together. In some scenarios, even with the extra output, the ambiguity from combining parts is so challenging such that post-processing is usually required on top of the pose prediction to increase precision. Therefore, the computational cost of the bottom-up technique suffers from additional output and post-processing.

Described herein is a system and method for performing human pose estimation which is neither top-down nor bottom-up. Instead, object detection technique(s) are adapted to estimate pose. Conventionally, object detection predicts bounding box(es) which are two points (e.g., left-top and right-bottom). The system and method increase the number of points to be human representative points (e.g., up to 17 points), and seamlessly integrate these extra points into the detection pipeline. The system and method does not suffer from using an extra person detector because it is integrated into a single network, and every person can be predicted all at once. In some embodiments, the system and method do not require extra output and/or post-processing as in the bottom-up method.

Referring to FIG. 1, a human pose prediction system 100 is illustrated. The system 100 can predict human pose(s) of a received image in accordance with predicted human feature(s) (e.g., 17 joints/aspects of human body). An action can then be taken based on the predicted human pose(s). In some embodiments, a machine or apparatus (not shown) can take action (e.g., stop) based on the predicted human pose. In some embodiments, the predicted human pose(s) can be displayed, for example, as an overlay to the received image.

The system 100 can include an input component 110 that receives an image (e.g., electronic file) comprising at least a portion of a human body. In some embodiments, the image is a frame of real-time video. In some embodiments, the image comprises at least a portion of a single human. In some embodiments, the image comprises at least a portion of a plurality of humans.

A human pose prediction component 120 can utilize a trained neural network 130 to predict human pose(s) of the received image in accordance with one or more predicted human feature(s). In some embodiments, when the image comprises at least a portion of a single human, the predicted human pose is of the single human. In some embodiments, when the image comprises at least a portion of a plurality of humans, a predicted human pose can be predicted for each of the plurality of humans. In some embodiments, when the image comprises at least a portion of a plurality of humans, a predicted human pose can be predicted for at least some of the plurality of humans.

Figure 2:
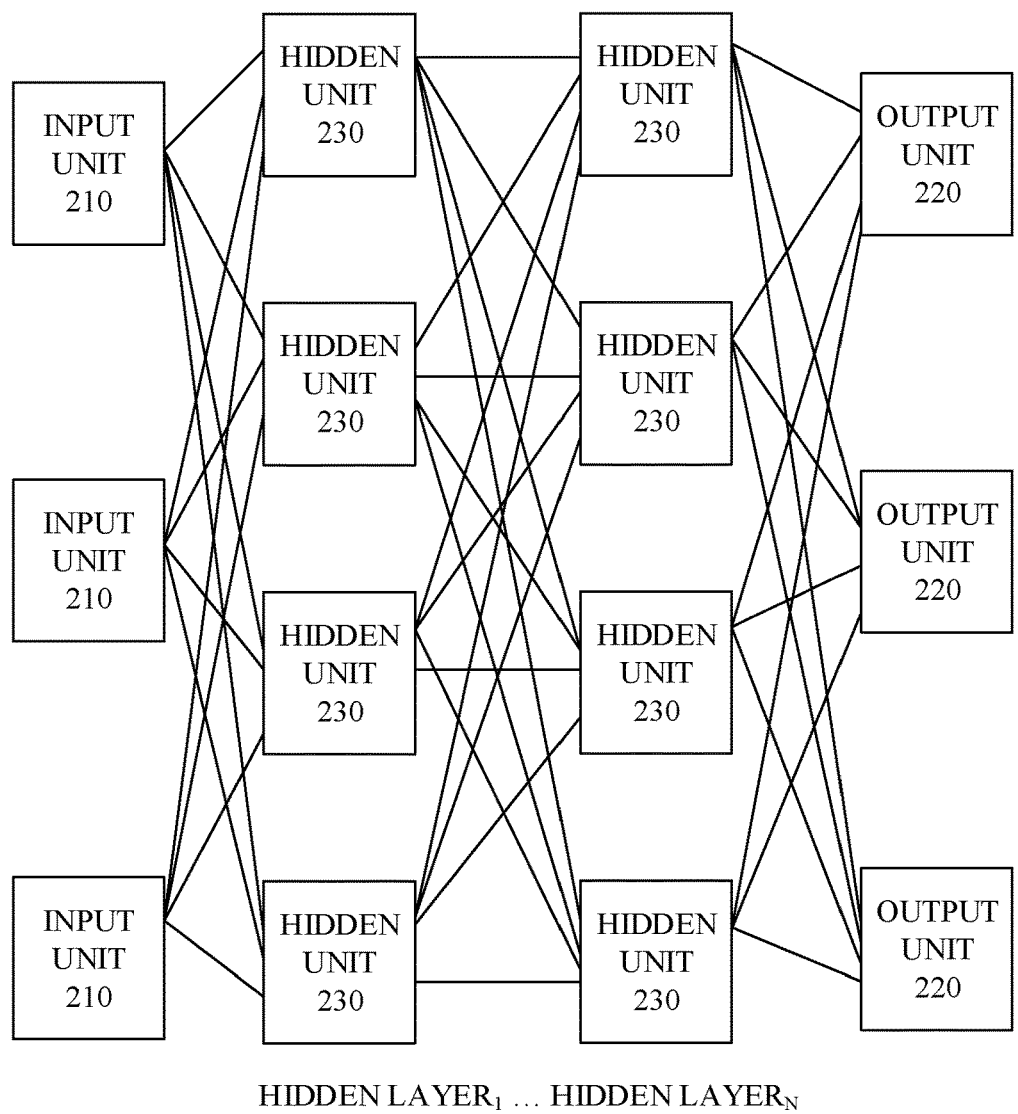
FIG. 2 is a diagram that illustrates an example neural network.

Referring briefly to FIG. 2, a neural network 200 can refer to an artificial neural network, a deep neural network, a multi-layer neural network, etc. that can learn to identify or classify features of one or more images without being specifically programmed to identify such features. The neural network 200 includes a series of input units 210, output units 220, and hidden units 230 disposed between the input units 210 and output units 220. Input units 210 may communicate information from a source (e.g., an image) to the hidden layers 230. No computation is generally performed in any of the input units 210.

Each layer of hidden units 230 may be a node that is interconnected to the previous and subsequent layer. During training of the neural network 200, each of the hidden units 230 may be weighted, and the weights assigned to each hidden unit 230 may be adjusted repeatedly via backpropagation, for example, to minimize the difference between the actual output and known or desired output. In some embodiments, a neural network 200 has at least four layers of hidden units 230. Input units 210 may correspond to m features or variables that can have an influence on a specific outcome such as whether a portion of an image contains one or more human feature(s). The example neural network 200 in FIG. 2 is one example of a configuration of a neural network. The disclosed implementations are not limited in the number of input, output, and/or hidden units 210, 220, 230, and/or the number of hidden layers.

In some embodiments, an end-to-end trained, single stage neural network is utilized. "End-to-end" refers to training of a single DNN in one stage such that parameters of the neural network are jointly trained. As an example, a neural network such as the You Only Look Once (YOLO) detection system may be utilized. According to this system, detection of an object within the image is examined as a single regression problem from image pixels to a bounding box. The neural network can be trained on a set of known images that contain known identities of entities and/or object classification. An image can be divided into a grid of size S×S. Each grid cell can predict B bounding boxes and confidence for those boxes. These confidence scores may reflect how confident the model is that a given box contains an entity and how accurate the box predicted by the model is. More than one bounding box or no bounding box may be present for any image. If no entity is present in a grid cell, then the confidence score is zero. Otherwise, the confidence score may be equal to the intersection over union between the predicted and ground truth. Each grid cell may also predict C conditional class probabilities which may be conditioned on the grid cell containing an object. One set of class probabilities may be predicted per grid cell regardless of the number of boxes B. The conditional class probabilities and the individual box confidence predictions may be multiplied to provide class-specific confidence scores for each box. These scores can encode both the probability of that class appearing in the box and how well the predicted box fits the entity. As an example, YOLO may utilize a neural network with several convolutional layers, e.g., four or more layers, and filter layers. The final layer may predict one or more of class probabilities and/or bounding box coordinates. Bounding box width and height may be normalized by the image width and height to fall between 0 and 1, and the x and y coordinates of the bounding box can be parameterized to be offsets of a particular grid cell location also between 0 and 1. The disclosed implementations are not limited to any particular type of neural network such as a deep learning neural network, a convolution neural network, a deformable parts model, etc.

Overall YOLO segments an image into fixed size grid, and the DNN learns to move the predefined grid to correct object position(s). A loss function is a measure of prediction accuracy. The loss function of YOLO is defined as:

$$Loss = \lambda_{coord} \sum_{i=0}^{S^2} \sum_{j=0}^{B} \mathbb{1}_{ij}^{obj} [(x_i - \hat{x}_i)^2 + (y_i - \hat{y}_i)^2] + \qquad (Eq. 1)$$

$$\lambda_{coord} \sum_{i=0}^{S^2} \sum_{j=0}^{B} \mathbb{1}_{ij}^{obj} \left[ \left( \sqrt{w_i} - \sqrt{\hat{w}_i} \right)^2 + \left( \sqrt{h_i} - \sqrt{\hat{h}_i} \right)^2 \right] +$$

$$\sum_{i=0}^{S^2} \sum_{j=0}^{B} \mathbb{1}_{ij}^{obj} (C_i - \hat{C}_i)^2 + \lambda_{noobj} \sum_{i=0}^{S^2} \sum_{j=0}^{B} \mathbb{1}_{ij}^{noobj} (C_i - \hat{C}_i)^2 +$$

$$\sum_{i=0}^{S^2} \mathbb{1}_{ij}^{obj} \sum_{c \in cls} (p_i(c) - \hat{p}_i(c))^2$$

where: x, y, w, h=bounding box
C=object confidence (there is an object or not)
p(c)=classification confidence (which class is the object)
S=number of grid
B=number of box from each grid
$\mathbb{1}_{ij}^{obj}$=denotes that the $j^{th}$ bounding box predictor in cell i is responsible for that prediction Instead of predicting boxes, the human pose prediction component 120 predicts human pose(s). Thus, in some embodiments, the trained neural network 130 is trained to only predict human poses. In some embodiments, the trained neural network 130 is trained to only predict another single class of objects (e.g., dogs, cats, etc.).

Figure 3:
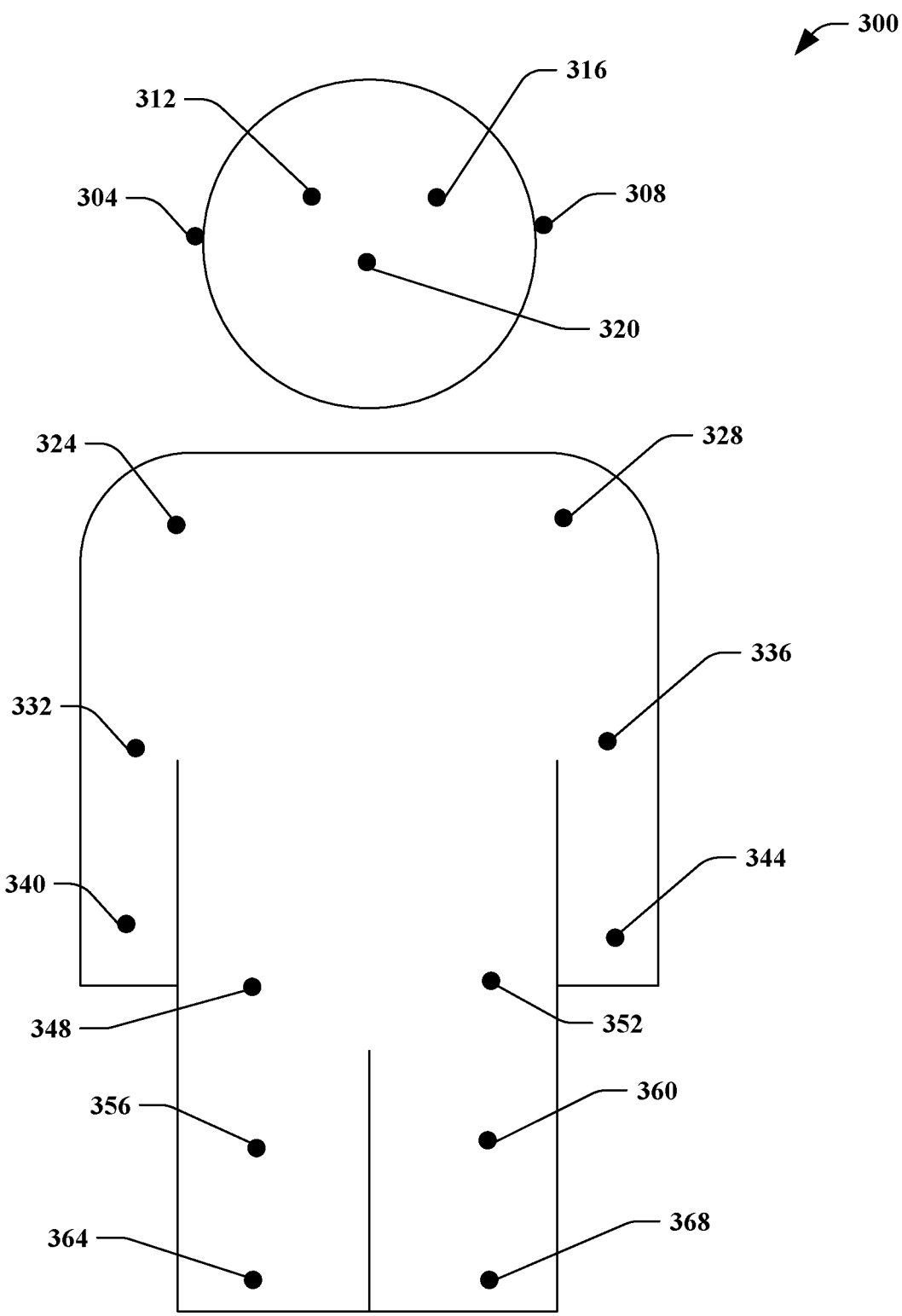
FIG. 3 is a diagram that illustrates exemplary joints/aspects of a human body.

Turning briefly to FIG. 3, a diagram 300 of exemplary joints/aspects of a human body. In some embodiments, a human pose is defined to comprise one or more of the following 17 joints/aspects of human body: right ear (304), left ear (308), right eye (312), left eye (316), nose (320), right shoulder (324), left shoulder (328), right elbow (332), left elbow (336), right wrist (340), left wrist (344), right hip (348), left hip (352), right knee (356), left knee (360), right ankle (364), and/or left ankle (368).

Since the human pose prediction component 120 is only predicting one class (e.g., human poses(s)), classification confidence of YOLO, as discussed above, is not required. Modifying the loss function of YOLO (Eq. (1)), the revised loss function for human pose prediction is:

$$Loss = \lambda_{coord} \sum_{i=0}^{S^2} \sum_{j=0}^{P} \sum_{k=0}^{17} \mathbb{1}_{ij}^{obj} [(x_{ik} - \hat{x}_{ik})^2 + (y_{ik} - \hat{y}_{ik})^2] + \qquad (Eq. 2)$$

$$\sum_{i=0}^{S^2} \sum_{j=0}^{P} \mathbb{1}_{ij}^{obj} (C_i - \hat{C}_i)^2 + \lambda_{noobj} \sum_{i=0}^{S^2} \sum_{j=0}^{P} \mathbb{1}_{ij}^{noobj} (C_i - \hat{C}_i)^2$$

where: $x_1, y_1, \ldots, x_{17}, y_{17}$=human pose
C=object confidence (e.g., there is a human or not)
S=number of grid
B=number of human pose from each grid
$\mathbb{1}_{ij}^{obj}$=denotes that the $j^{th}$ bounding box predictor in cell i is responsible for that prediction In some embodiments, the neural network can be trained by receiving input images, with each of the input images having known entities (e.g., human poses). For example, training images may be of various persons, and some of the training images may not contain any human poses. A prediction of human pose(s) for each of the known entities in the training images may be generated. As explained above with regard to FIG. 2, there may be several hidden layers in the neural network.

An output component 140 can take an action based on the predicted human posed of the human pose prediction component 120. In some embodiments, a machine or apparatus (not shown) can take action (e.g., stop) based on the predicted human pose(s). In some embodiments, the predicted human pose(s) can be displayed, for example, as an overlay to the received image. In some embodiments, information regarding the predicted human pose(s) (e.g., up to 17 points) can be provided, for example, to a gaming system and/or to control an avatar associated with particular user(s) associated with the predicted human pose(s).

Figure 4:
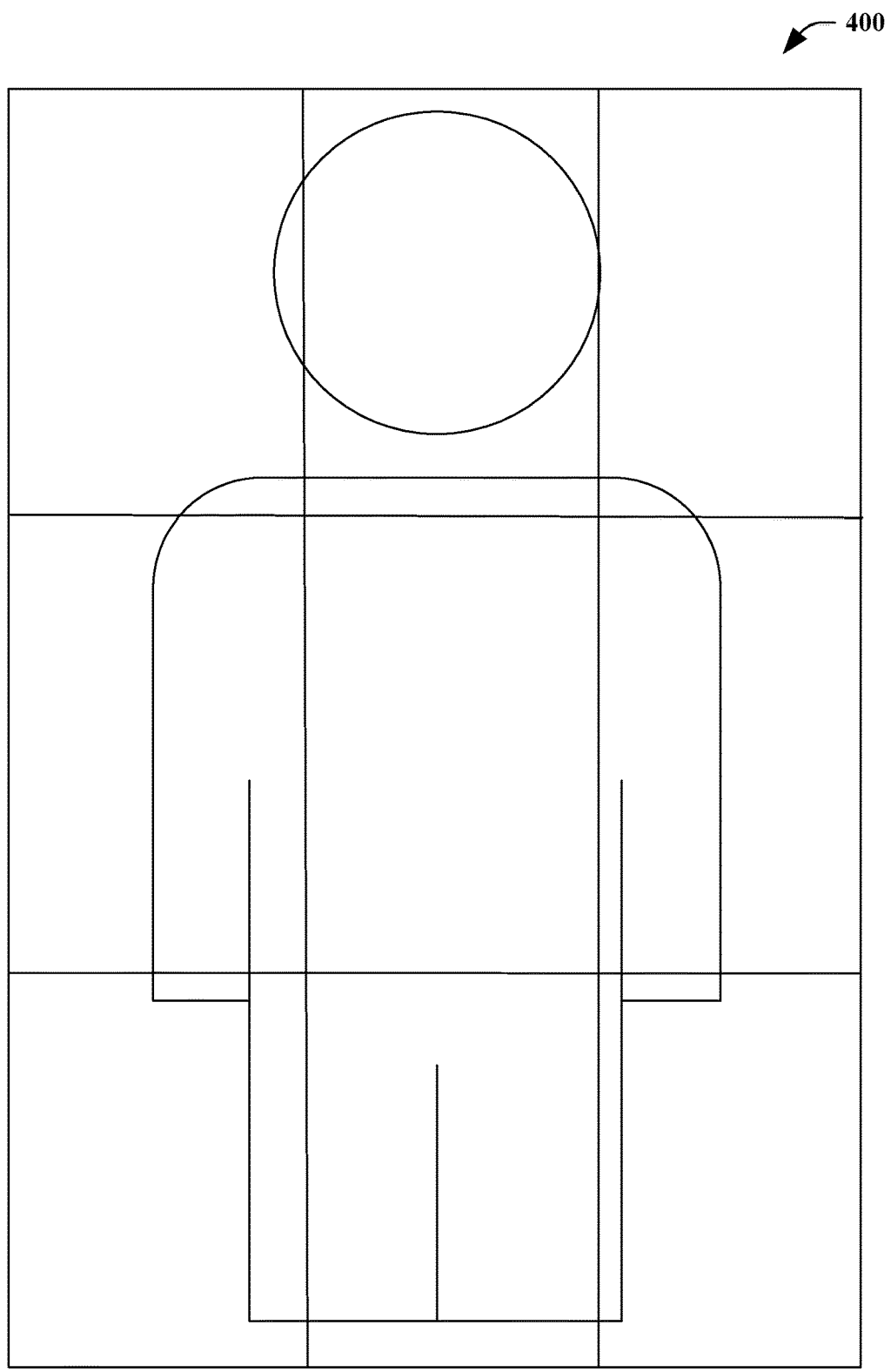
FIG. 4 is an exemplary image.
Figure 5:
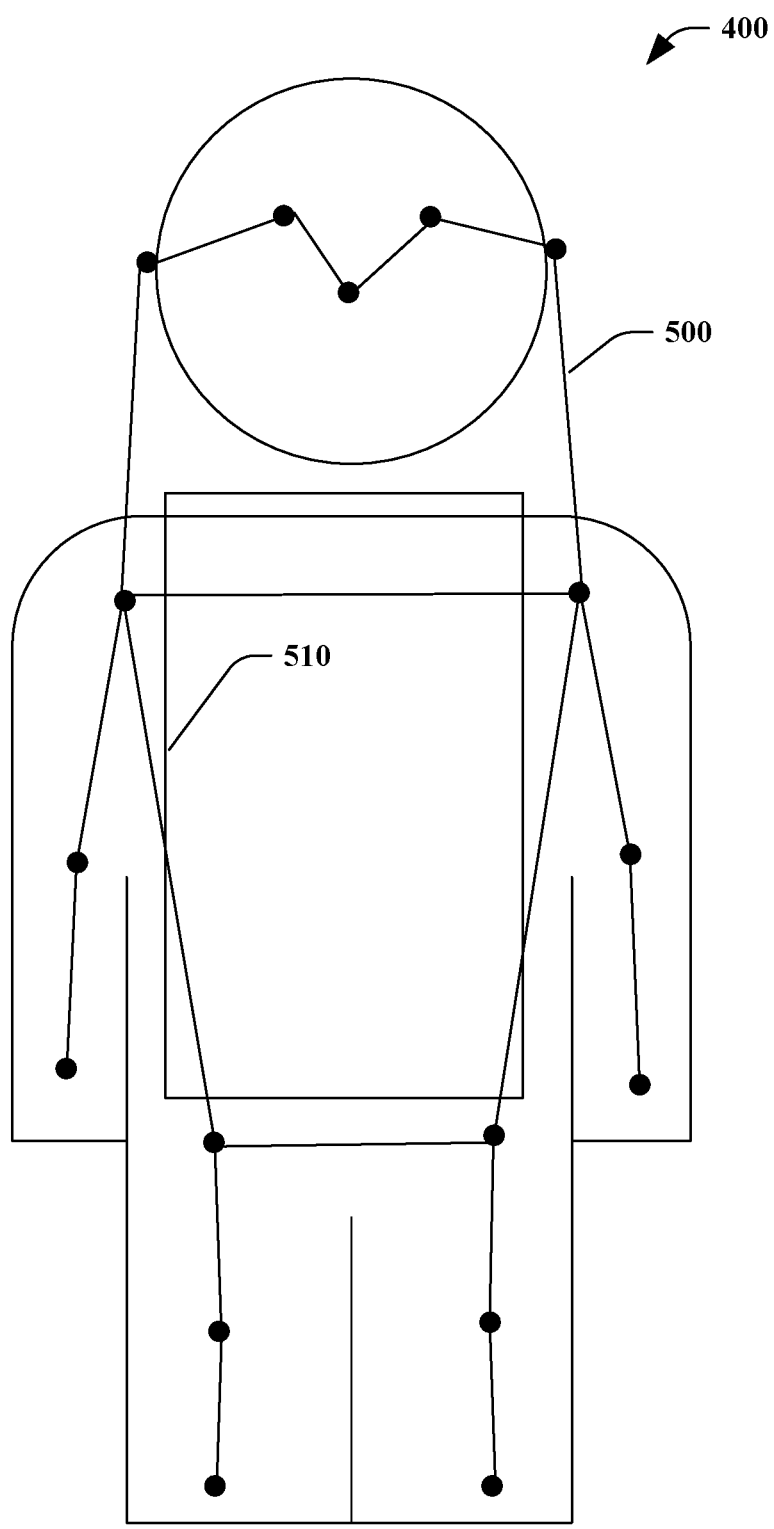
FIG. 5 is an exemplary image overlaid with a predicted human pose.

Referring to FIG. 4, an image 400 overlaid with a 3×3 grid illustrated. In FIG. 5, the image 400 is overlaid with a predicted human pose 500 generated by the system 100. A portion 510 of the grid from FIG. 4 is presented for comparison purposes. The points reflect predicted human features. The predefined ordering of the predicted human pose 500 is provided for purposes of explanation and not limitation.

In some embodiments, the predicted human pose comprises a point associated with a particular predicted human feature. In some embodiments, the predicted human pose comprises a plurality of points (e.g., up to 17) at least some of which are joined by line segment(s) based on a predefined ordering, for example, as depicted in FIG. 5. In some embodiments, the predicted human pose comprises another portion of the human body occluded in the received image (e.g., covered by an object in the image).

Figure 6:
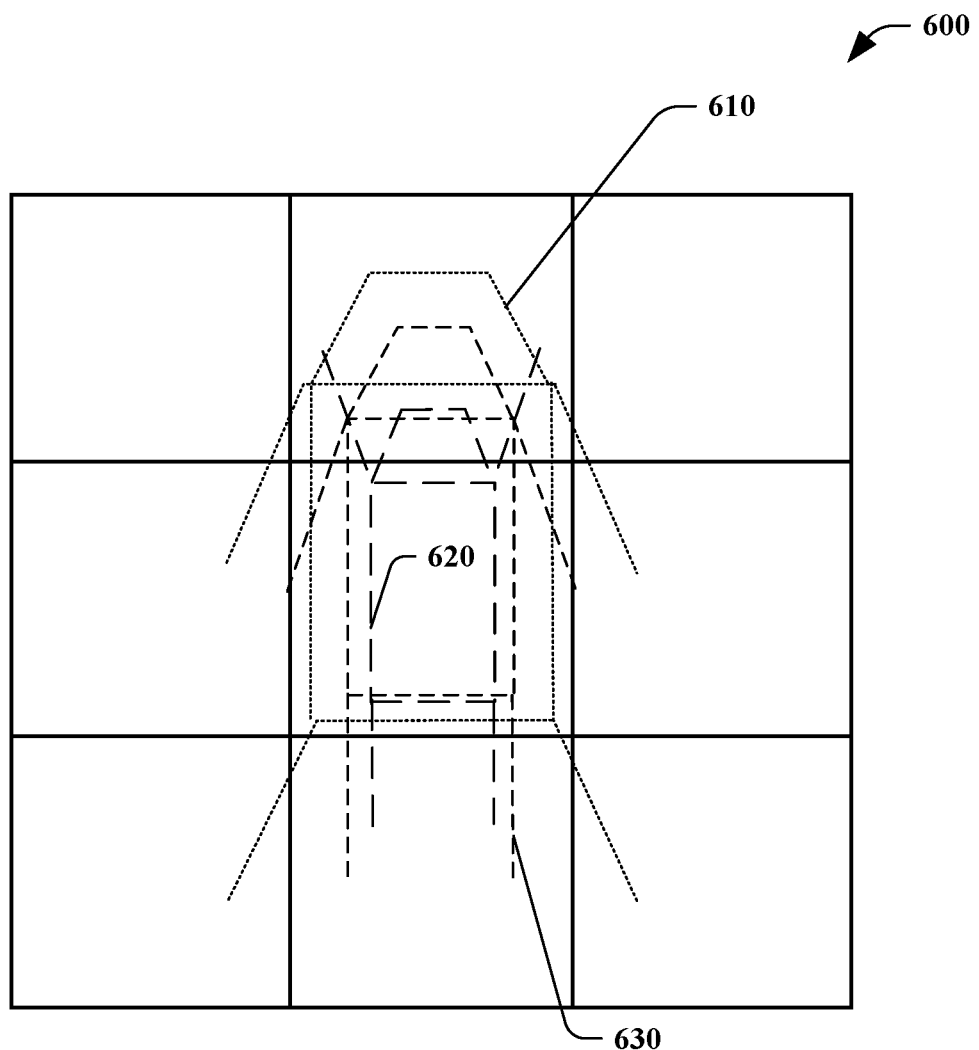
FIG. 6 is a diagram illustrating various exemplary anchor poses.

In some embodiments, the system 100 can adapt single shot detection (SSD) for object detection in which a different aspect ratio for the anchor box is utilized, such that, if the predefined box is closer to the object, the detection precision can be higher. To adapt to SSD to pose prediction, different types of poses can be predefined as anchor poses (e.g., neutral, facing left-right, lift arm, sitting, etc.) utilized by the human pose prediction component 120. FIG. 6 is a diagram 600 illustrating three exemplary anchor poses 610, 620, 630. The exemplary anchor poses 610, 620, 630 are provided for purposes of explanation and not limitation. In some embodiments, for predicted human pose estimations that overlap, a highest confidence pose estimation within the intersect-over-union (IOU) threshold is selected (e.g., non-maximum suppression).

Figure 7:
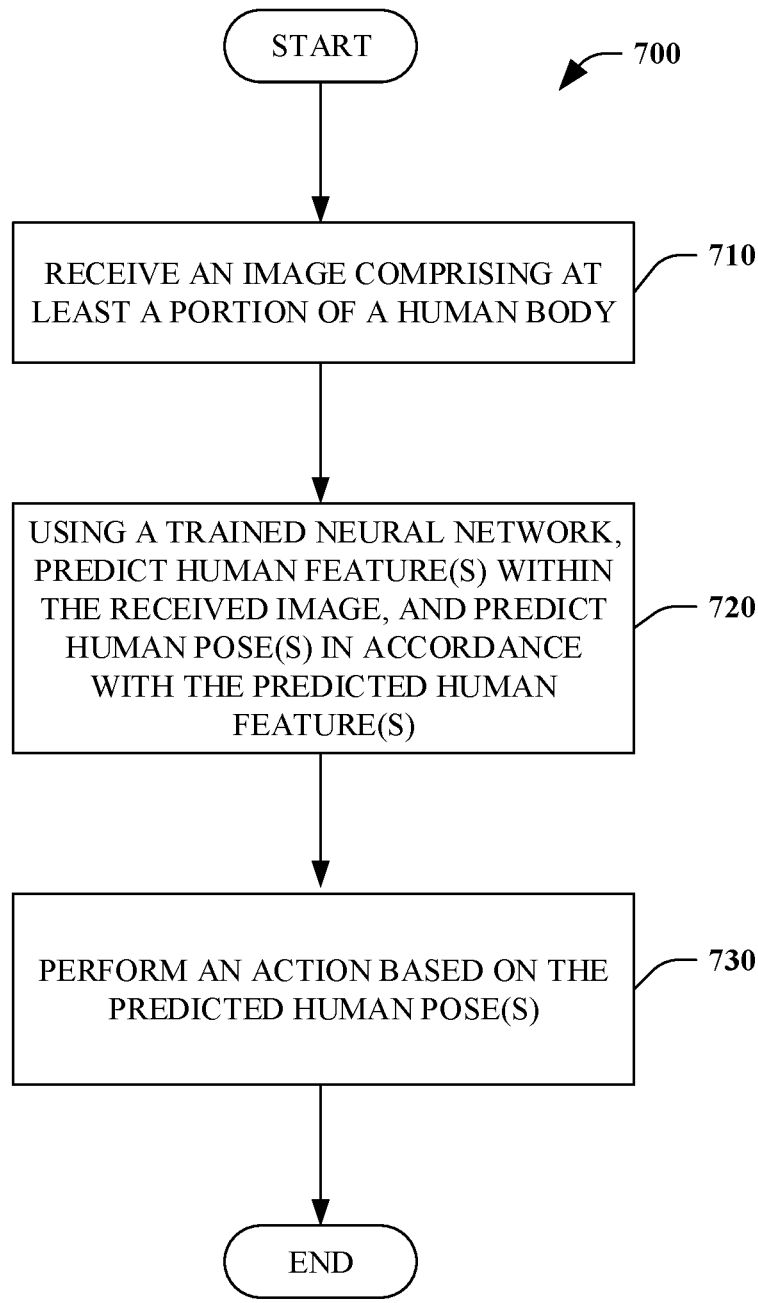
FIG. 7 is a flow chart of a method of predicting a human pose.
Figure 8:
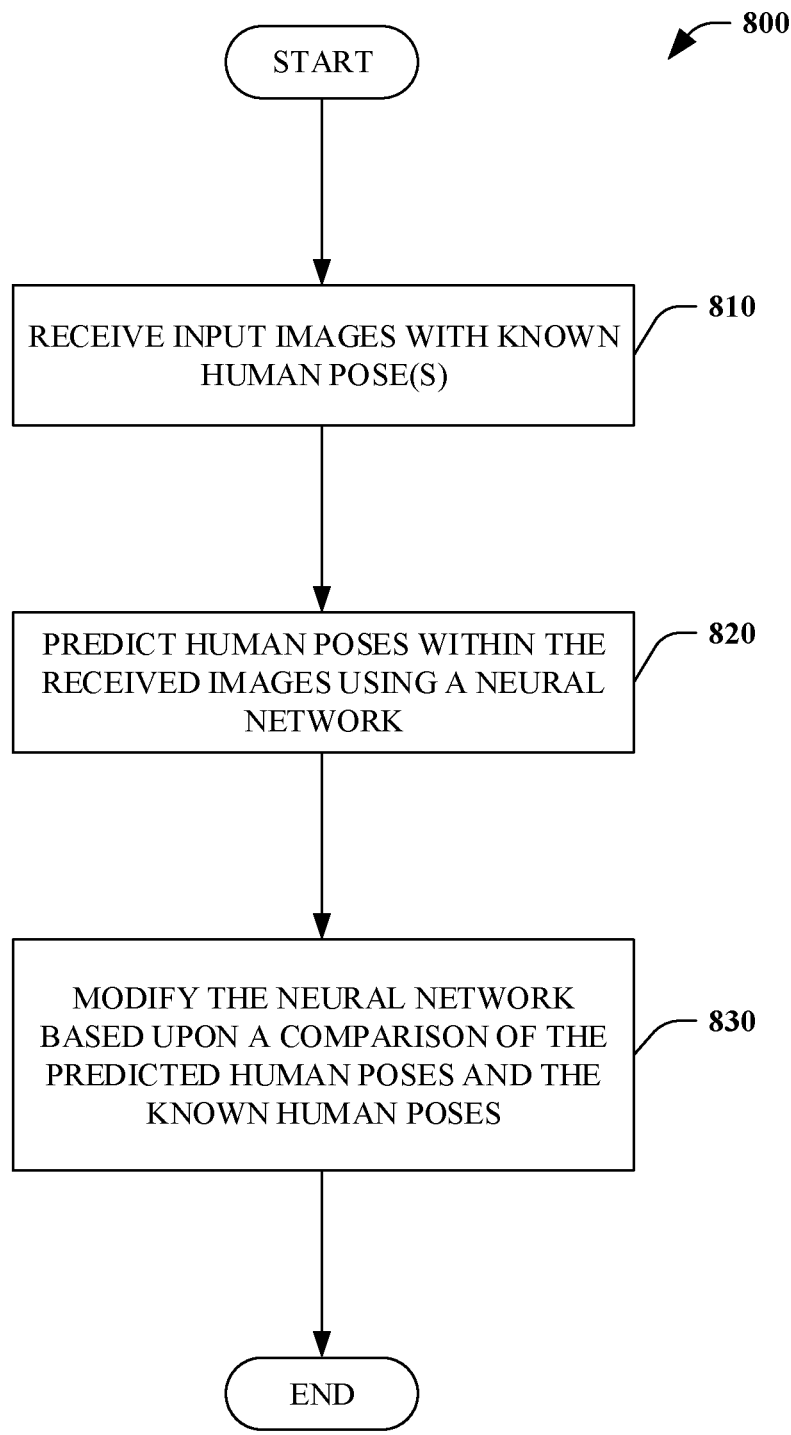
FIG. 8 is a flow chart of a method of training a neural network to predict human poses.
Figure 9:
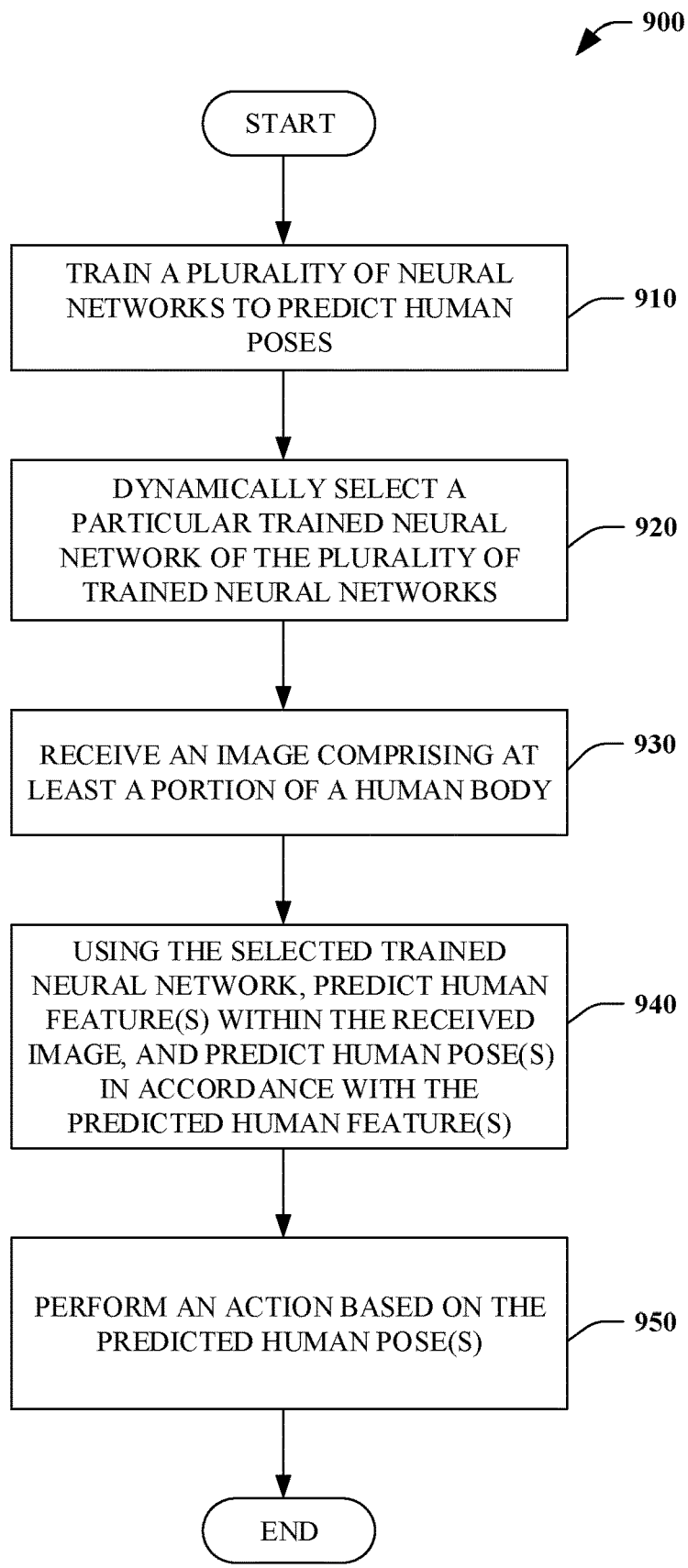
FIG. 9 is a flow chart of another method of predicting a human pose.

FIGS. 7-9 illustrate exemplary methodologies relating to predicting human pose(s). While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring to FIG. 7, a method of predicting a human pose 700 is illustrated. In some embodiments, the method 700 is performed by the system 100.

At 710, an image comprising at least a portion of a human body is received. At 720, a trained neural network is used to predict human feature(s) within the received image, and, to predict human pose(s) in accordance with the predicted human feature(s). The trained neural network can comprise an end-to-end trained, single stage deep neural network. At 730, an action is performed based on the predicted human pose(s).

Turning to FIG. 8, a method of training a neural network 800 is illustrated. In some embodiments, the method 800 is used to train the trained neural network 130.

At 810, input images with known human pose(s) are received. At 820, human poses are predicted within the received images using a neural network. At 830, the neural network is modified (as discussed above) based upon a comparison of the predicted human poses and known human pose(s).

Next, referring to FIG. 9, a method of predicting a human pose 900 is illustrated. In some embodiments, the method 900 is performed by the system 100.

At 910, a plurality of neural networks is trained to predict human poses. In some embodiments, each of the plurality of neural networks can be trained to predict human poses for a particular device (e.g., particular mobile phone, particular processor, particular computing resources). For example, for processor(s) having less processing capability, neural network(s) having less layer(s) and/or trained to recognize fewer human feature(s) can be used to predict human poses while for processor(s) having greater processing capability, neural network(s) having more layer(s) and/or trained to recognize more human feature(s) can be used.

In some embodiments, each of the plurality of neural networks can be trained to predict human poses for a particular processing power (e.g., available computing power). For example, neural network(s) having less layer(s) and/or trained to recognize fewer human feature(s) can be used to predict human poses for device(s) have less processing power.

At 920, a particular trained neural network of the plurality of trained neural networks is dynamically selected. For example, selection can be performed to adaptively respond to real-time condition(s) existing at a time human pose prediction is to be performed. In some embodiments, the particular trained neural network is dynamically selected based, at least in part, upon a device upon which the human pose prediction is being performed. In some embodiments, the particular trained neural network is dynamically selected based, at least in part, upon currently available computing power to execute the human pose prediction. In some embodiments, selection is based, at least in part, upon input received from a user (e.g., quicker less accurate or slower more accurate). In some embodiments, to minimize computational resource consumption related to switching from a first trained neural network to a second neural network, selection is performed prior to a request for human pose prediction (e.g., at powerup of the device).

At 930, an image comprising at least a portion of a human body is received. At 940, the selected trained neural network is used to predict human feature(s) within the received image, and, to predict human pose(s) in accordance with the predicted human feature(s). At 950, an action is performed based on the predicted human pose(s).

Described herein is a human pose prediction system, comprising: a computer comprising a processor and a memory having computer-executable instructions stored thereupon which, when executed by the processor, cause the computer to: receive an image comprising at least a portion of a human body; use a trained neural network to predict one or more human features within the received image, and, to predict one or more human poses in accordance with the predicted one or more human features, wherein the trained neural network comprises an end-to-end trained, single stage deep neural network; and perform an action based on the predicted one or more human poses.

The system can further include wherein the trained neural network is trained to only predict human features and human poses. The system can further include wherein the trained neural network is further trained to predict seventeen aspects of the human body including a right ear, a left ear, a right eye, a left eye, a nose, a right shoulder, a left shoulder, a right elbow, a left elbow, a right wrist, a left wrist, a right hip, a left hip, a right knee, a left knee, a right ankle, and, a left ankle. The system can further include wherein the trained neural network is further trained to predict one or more aspects of the human body including a right ear, a left ear, a right eye, a left eye, a nose, a right shoulder, a left shoulder, a right elbow, a left elbow, a right wrist, a left wrist, a right hip, a left hip, a right knee, a left knee, a right ankle, or, a left ankle.

The system can further include wherein the predicted one or more human poses comprise at least one point associated with a particular predicted human feature. The system can further include wherein the predicted one or more human poses comprise a plurality of points associated with particular predicted human features, at least some of the points are joined by one or more line segments based on a predefined ordering. The system can further include wherein the predicted one or more human poses comprise another portion of the human body occluded in the received image.

The system can further include wherein the trained neural network utilizes one or more predefined anchor poses to predict the one or more human poses. The system can include the memory having further computer-executable instructions stored thereupon which, when executed by the processor, cause the computer to: modify the predicted human poses utilizing non-maximum suppression for predicted human poses that overlap. The system can further include wherein the action performed comprising displaying the predicted one or more human poses as an overlay with the image.

Described herein is a method of predicting a human pose, comprising: receiving an image comprising at least a portion of a human body; using a particular trained neural network, predicting one or more human features within the received image, and, predicting one or more human poses in accordance with the predicted one or more human features, wherein the trained neural network comprises an end-to-end trained, single stage deep neural network; and performing an action based on the predicted one or more human poses.

The method can further include wherein the particular trained neural network is trained to only predict human poses, and, the particular trained neural network is further trained to predict seventeen aspects of the human body including a right ear, a left ear, a right eye, a left eye, a nose, a right shoulder, a left shoulder, a right elbow, a left elbow, a right wrist, a left wrist, a right hip, a left hip, a right knee, a left knee, a right ankle, and, a left ankle.

The method can further include wherein the trained neural network is trained to only predict human poses, and the trained neural network is further trained to predict one or more aspects of the human body including a right ear, a left ear, a right eye, a left eye, a nose, a right shoulder, a left shoulder, a right elbow, a left elbow, a right wrist, a left wrist, a right hip, a left hip, a right knee, a left knee, a right ankle, or, a left ankle.

The method can further include training a plurality of neural networks to predict human poses; and, dynamically selecting the particular trained neural network of the plurality of trained neural networks based upon currently available computing power. The method can further include wherein the predicted one or more human poses comprise a plurality of points associated with particular predicted human features with at least some of the points joined by one or more line segments based on a predefined ordering. The method can further include wherein the predicted one or more human poses comprise another portion of the human body occluded in the received image. The method can further include wherein the trained neural network utilizes one or more predefined anchor poses to predict the one or more human poses.

Described herein is a computer storage media storing computer-readable instructions that when executed cause a computing device to: receive an image comprising at least a portion of a human body; use a trained neural network to predict one or more human features within the received image, and, to predict one or more human poses in accordance with the predicted one or more human features, wherein the trained neural network comprises an end-to-end trained, single stage deep neural network trained to only predict humans; and perform an action based on the predicted one or more human poses.

The computer storage media can further include wherein the trained neural network is trained to predict seventeen aspects of the human body including a right ear, a left ear, a right eye, a left eye, a nose, a right shoulder, a left shoulder, a right elbow, a left elbow, a right wrist, a left wrist, a right hip, a left hip, a right knee, a left knee, a right ankle, and, a left ankle. The computer storage media can further include wherein the predicted one or more human poses comprise a plurality of points associated with particular predicted human features with at least some of the points joined by one or more line segments based on a predefined ordering.

Figure 10:
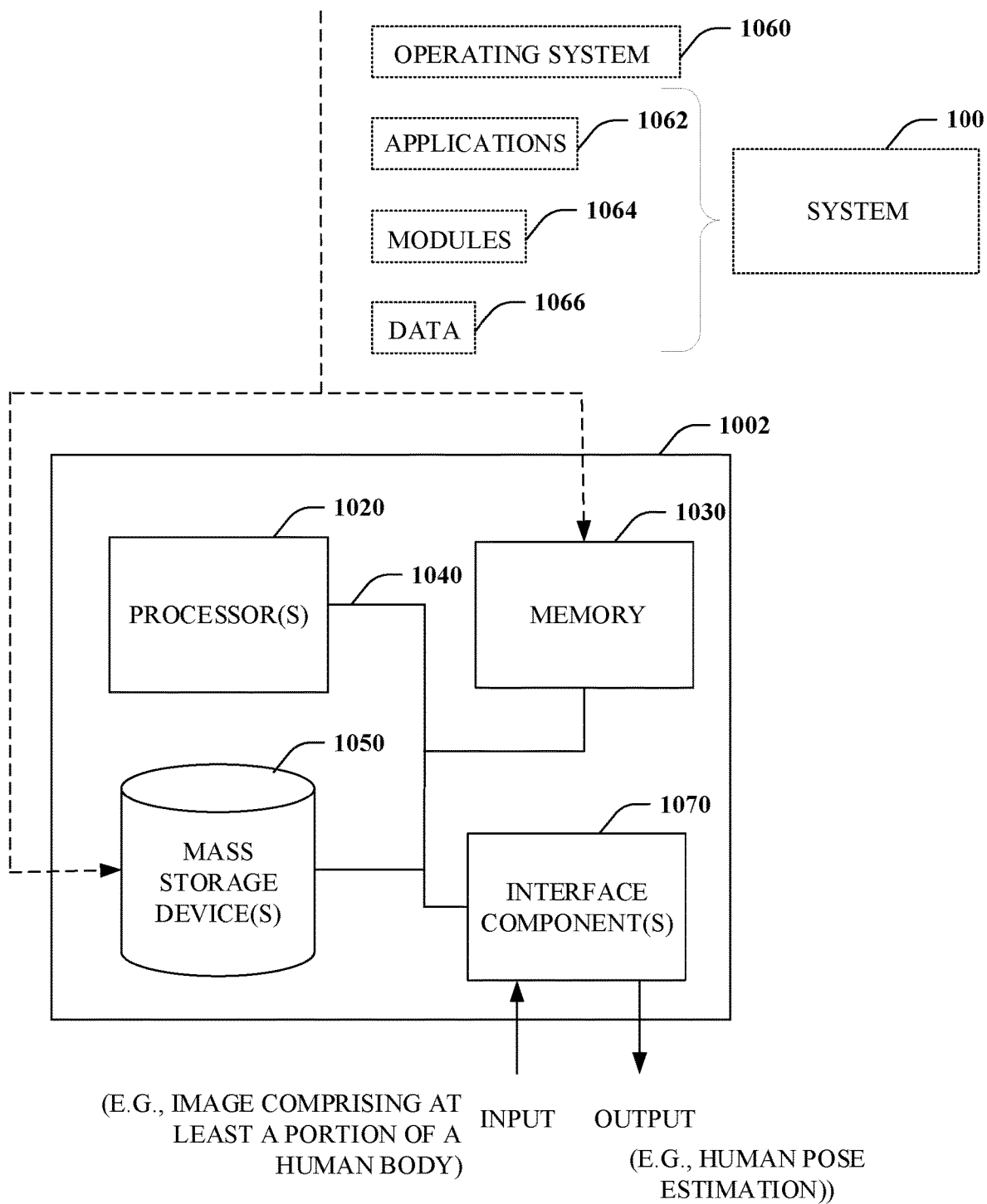
FIG. 10 is a functional block diagram that illustrates an exemplary computing system.

With reference to FIG. 10, illustrated is an example general-purpose computer or computing device 1002 (e.g., mobile phone, desktop, laptop, tablet, watch, server, handheld, programmable consumer or industrial electronics, set-top box, game system, compute node, etc.). For instance, the computing device 1002 may be used in the human pose prediction system 100.

The computer 1002 includes one or more processor(s) 1020, memory 1030, system bus 1040, mass storage device(s) 1050, and one or more interface components 1070. The system bus 1040 communicatively couples at least the above system constituents. However, it is to be appreciated that in its simplest form the computer 1002 can include one or more processors 1020 coupled to memory 1030 that execute various computer executable actions, instructions, and or components stored in memory 1030. The instructions may be, for instance, instructions for implementing functionality described as being carried out by one or more components discussed above or instructions for implementing one or more of the methods described above.

The processor(s) 1020 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 1020 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 1020 can be a graphics processor.

The computer 1002 can include or otherwise interact with a variety of computer-readable media to facilitate control of the computer 1002 to implement one or more aspects of the claimed subject matter. The computer-readable media can be any available media that can be accessed by the computer 1002 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 1002. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 1030 and mass storage device(s) 1050 are examples of computer-readable storage media. Depending on the exact configuration and type of computing device, memory 1030 may be volatile (e.g., RAM), non-volatile (e.g., ROM, flash memory, etc.) or some combination of the two. By way of example, the basic input/output system (BIOS), including basic routines to transfer information between elements within the computer 1002, such as during start-up, can be stored in nonvolatile memory, while volatile memory can act as external cache memory to facilitate processing by the processor(s) 1020, among other things.

Mass storage device(s) 1050 includes removable/non-removable, volatile/non-volatile computer storage media for storage of large amounts of data relative to the memory 1030. For example, mass storage device(s) 1050 includes, but is not limited to, one or more devices such as a magnetic or optical disk drive, floppy disk drive, flash memory, solid-state drive, or memory stick.

Memory 1030 and mass storage device(s) 1050 can include, or have stored therein, operating system 1060, one or more applications 1062, one or more program modules 1064, and data 1066. The operating system 1060 acts to control and allocate resources of the computer 1002. Applications 1062 include one or both of system and application software and can exploit management of resources by the operating system 1060 through program modules 1064 and data 1066 stored in memory 1030 and/or mass storage device (s) 1050 to perform one or more actions. Accordingly, applications 1062 can turn a general-purpose computer 1002 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part of, an application 1062, and include one or more modules 1064 and data 1066 stored in memory and/or mass storage device(s) 1050 whose functionality can be realized when executed by one or more processor(s) 1020.

In accordance with one particular embodiment, the processor(s) 1020 can correspond to a system on a chip (SOC) or like architecture including, or in other words integrating, both hardware and software on a single integrated circuit substrate. Here, the processor(s) 1020 can include one or more processors as well as memory at least similar to processor(s) 1020 and memory 1030, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 1002 also includes one or more interface components 1070 that are communicatively coupled to the system bus 1040 and facilitate interaction with the computer 1002. By way of example, the interface component 1070 can be a port (e.g., serial, parallel, PCMCIA, USB, FireWire, etc.) or an interface card (e.g., sound, video, etc.) or the like. In one example implementation, the interface component 1070 can be embodied as a user input/output interface to enable a user to enter commands and information into the computer 1002, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 1070 can be embodied as an output peripheral interface to supply output to displays (e.g., LCD, LED, plasma, etc.), speakers, printers, and/or other computers, among other things. Still further yet, the interface component 1070 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system, comprising:
   a processor; and
   a memory having computer-executable instructions stored thereupon which, when executed by the processor, cause the system to:
   obtain an image comprising at least a portion of a human body;
   divide the image into a plurality of cells;
   predict, using a trained neural network, respective pose confidences for each cell of the plurality of cells, the respective pose confidences corresponding to one or more human poses having multiple human feature points; and
   perform an action based at least on a particular pose confidence indicating that a particular human pose is predicted to occur within a particular cell.

2. The system of claim 1, wherein the trained neural network is trained to only predict human features and human poses.

3. The system of claim 2, wherein the trained neural network is further trained to predict seventeen aspects of the human body including a right ear, a left ear, a right eye, a left eye, a nose, a right shoulder, a left shoulder, a right elbow, a left elbow, a right wrist, a left wrist, a right hip, a left hip, a right knee, a left knee, a right ankle, and, a left ankle.

4. The system of claim 2, wherein the trained neural network is further trained to predict one or more aspects of the human body including a right ear, a left ear, a right eye, a left eye, a nose, a right shoulder, a left shoulder, a right elbow, a left elbow, a right wrist, a left wrist, a right hip, a left hip, a right knee, a left knee, a right ankle, or, a left ankle.

5. The system of claim 1, wherein the particular human pose comprises at least one point associated with a particular predicted human feature.

6. The system of claim 1, wherein the particular human pose comprises a plurality of points associated with particular predicted human features, and at least some of the points are joined by one or more line segments based on a predefined ordering.

7. The system of claim 1, wherein the particular human pose comprises another portion of the human body that is occluded in the image.

8. The system of claim 1, wherein the trained neural network utilizes a plurality of predefined anchor poses to predict the one or more human poses and outputs a corresponding pose confidence for each predefined anchor pose for each cell of the plurality of cells.

9. The system of claim 1, the memory having further computer-executable instructions stored thereupon which, when executed by the processor, cause the system to:
   select the particular human pose from a plurality of overlapping predicted human poses utilizing non-maximum suppression.

10. The system of claim 1, wherein the action comprises displaying the particular human pose as an overlay with the image.

11. The system of claim 1, the trained neural network having at least one human pose predictor for each cell of the plurality of cells, wherein the respective pose confidences are output by respective human pose predictors of each cell.

12. A method, comprising:
obtaining an image comprising at least a portion of a human body;
dividing the image into a plurality of cells;
predicting, using a particular trained neural network, respective pose confidences for each cell of the plurality of cells, the respective pose confidences corresponding to one or more human poses having multiple human feature points; and
performing an action based at least on the respective pose confidences.

13. The method of claim 12, wherein the particular trained neural network is trained to only predict human poses, and, the particular trained neural network is further trained to predict seventeen aspects of the human body including a right ear, a left ear, a right eye, a left eye, a nose, a right shoulder, a left shoulder, a right elbow, a left elbow, a right wrist, a left wrist, a right hip, a left hip, a right knee, a left knee, a right ankle, and, a left ankle.

14. The method of claim 12, wherein the particular trained neural network is trained to only predict human poses, and the particular trained neural network is further trained to predict one or more aspects of the human body including a right ear, a left ear, a right eye, a left eye, a nose, a right shoulder, a left shoulder, a right elbow, a left elbow, a right wrist, a left wrist, a right hip, a left hip, a right knee, a left knee, a right ankle, or, a left ankle.

15. The method of claim 12, further comprising:
training a plurality of neural networks to predict human poses; and
dynamically selecting the particular trained neural network from the plurality of trained neural networks based at least upon currently available computing power.

16. The method of claim 12, wherein the one or more human poses comprise a plurality of points associated with particular predicted human features with at least some of the points joined by one or more line segments based on a predefined ordering.

17. The method of claim 12, wherein the particular trained neural network utilizes one or more predefined anchor poses to predict the one or more human poses.

18. A computer storage media storing computer-readable instructions that, when executed, cause a computing device to:
obtain an image comprising at least a portion of a human body;
divide the image into a plurality of cells;
predict, using a trained neural network, respective pose confidences for each cell of the plurality of cells, the respective pose confidences corresponding to one or more human poses having human features; and
perform an action based at least on a particular pose confidence indicating that a particular human pose occurs in a particular cell.

19. The computer storage media of claim 18, wherein the trained neural network is trained to predict seventeen aspects of the human body including a right ear, a left ear, a right eye, a left eye, a nose, a right shoulder, a left shoulder, a right elbow, a left elbow, a right wrist, a left wrist, a right hip, a left hip, a right knee, a left knee, a right ankle, and, a left ankle.

20. The computer storage media of claim 18, wherein the trained neural network is trained to predict at least three aspects of the human body, the at least three aspects selected from a group comprising a right ear, a left ear, a right eye, a left eye, a nose, a right shoulder, a left shoulder, a right elbow, a left elbow, a right wrist, a left wrist, a right hip, a left hip, a right knee, a left knee, a right ankle, and, a left ankle.

* * * * *